US007213954B2

(12) United States Patent
Strambersky et al.

(10) Patent No.: US 7,213,954 B2
(45) Date of Patent: May 8, 2007

(54) VARIABLE ADAPTIVE PROJECTOR SYSTEM FOR MOTOR VEHICLES

(75) Inventors: Libor Strambersky, Jicina (CZ); Milan Cejnek, Novy Jicin (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 280 days.

(21) Appl. No.: 10/959,394

(22) Filed: Oct. 6, 2004

(65) Prior Publication Data

US 2005/0128766 A1 Jun. 16, 2005

(30) Foreign Application Priority Data

Oct. 6, 2003 (CZ) ................................ 2003-2711

(51) Int. Cl.
*B60Q 1/06* (2006.01)
*F21V 14/08* (2006.01)

(52) U.S. Cl. ...................... 362/539; 362/284; 362/324; 362/464; 362/512

(58) Field of Classification Search ................ 362/538, 362/539, 284, 464, 512, 523
See application file for complete search history.

(56) References Cited

U.S. PATENT DOCUMENTS

| | | | | |
|---|---|---|---|---|
| 4,621,307 | A | 11/1986 | Weber | |
| 4,875,141 | A | 10/1989 | Miyauchi et al. | |
| 4,879,636 | A | 11/1989 | Yamagishi et al. | |
| 4,918,580 | A | 4/1990 | Nino | |
| 4,928,214 | A | 5/1990 | Oyama | |
| 5,305,189 | A | 4/1994 | Sekiguchi | |
| 5,339,226 | A | 8/1994 | Ishikawa | |
| 5,343,371 | A | 8/1994 | Kobayashi et al. | |
| 7,008,093 | B2 * | 3/2006 | Fukawa et al. | 362/539 |
| 2002/0186565 | A1 | 12/2002 | Taniuchi et al. | |

FOREIGN PATENT DOCUMENTS

| | | |
|---|---|---|
| CZ | PV 72-93 | 1/1993 |
| FR | 2 636 282 | 3/1990 |
| FR | 2 670 727 A1 | 6/1992 |
| GB | 2 145 214 A | 3/1985 |
| GB | 2 266 947 | 11/1993 |

* cited by examiner

*Primary Examiner*—Sandra O'Shea
*Assistant Examiner*—Anabel Ton
(74) *Attorney, Agent, or Firm*—Brinks Hofer Gilson & Lione

(57) ABSTRACT

A variable adaptive projector system for motor vehicles comprises a positioning mechanism for variation the positions of the basic shield (3) and the wet road shield (4) of the projector lighting unit between the defined positions.

19 Claims, 2 Drawing Sheets

VARIABLE ADAPTIVE PROJECTOR SYSTEM FOR MOTOR VEHICLES

BACKGROUND

1. Field of the Invention

The invention relates to a variable adaptive projector system for motor vehicles, and, more particularly, to a structure designed to vary the positions of shields inside the projector lighting unit in order to change the spatial distribution of light on the road. The shields in projector lighting unit can be placed in four defined positions for generating four different beam patterns: a wet road beam function for bad weather; a low beam function (passing beam); a high beam function (driving beam); and a motorway beam function for highway driving.

2. Related Technology

In order to generate low beam light and high beam light, the prior art headlamps have typically been equipped with either separate lighting units or combined lighting units utilizing two-filament light sources. Another possibility for combining low beam and high beam light involves a mechanism installed inside the lighting unit and providing for movement of an optical element, such as a shield, a light source, part of a reflector or the whole reflector itself.

For motorway and wet road (rain or bad weather) beam function, the additional lighting units are needed. The main disadvantages of these additional lighting units consist in higher demands required by the installation of these units in the headlamp, the additional light sources required, the higher power requirements and the higher costs.

SUMMARY OF THE INVENTION

The above mentioned disadvantages have been eliminated and the providing of low beam, high beam, motorway and wet road light has been solved in accordance with this invention by means of a variable adaptive projector system for motor vehicles. The projector system includes: a reflector, a light source, a basic shield, a wet road shield, a lens and a mechanism for varying the positions of the basic shield and the wet road shield, relative to the reflector, positions for low beam light, motorway light, high beam light and wet road light.

For wet road light, the wet road shield is positioned a distance $z_3$ above the focal point of the ellipsoidal reflector, when $$z_3=b_1\cdot\beta+b_3\cdot\beta^3+b_5\cdot\beta^5+b_7\cdot\beta^7+\ldots,\text{ for }\beta\approx(0\div5),$$

where $b_{1,3,5,7}, \ldots$ are constants characterizing the aspherical lens. The position of basic shield is shifted a distance $z_1$ below the focal point of the ellipsoidal reflector, when $$z_1=b_1\cdot\alpha+b_3\cdot\alpha^3+b_5\cdot\alpha^5+b_7\cdot\alpha^7+\ldots,\text{ for }\alpha\approx(0\div3),$$

where $b_{1,3,5,7}, \ldots$ are constants characterizing the aspherical lens.

For low beam light, the basic shield is in proximity of the focal point of the reflector and the wet road shield is shifted by distance $z_4$ above the focal point of the ellipsoidal reflector, when $z_{4>z3}$.

For motorway light, the basic shield is shifted by distance $z_1$ below the focal point of the ellipsoidal reflector, when $$z_1=b_1\cdot\alpha+b_3\cdot\alpha^3+b_5\cdot\alpha^5+b_7\cdot\alpha^7+\ldots,\text{ for }\alpha\approx(0\div3),$$

where $b_{1,3,5,7}, \ldots$ are constants characterizing the aspherical lens. In this mode of operation, the wet road shield is shifted by distance $z_4$ above the focal point of the ellipsoidal reflector, when $z_4>z_3$.

For high beam light, the basic shield is shifted by distance $z_2$ below the focal point of the ellipsoidal reflector, when $z_2>z_1$, and the wet road shield is shifted by distance $z_4$ above the focal point of the ellipsoidal reflector, when $z_4>z_3$.

Change of positions of basic shield and wet road shield is advantageously attained by a linear motor. Change of positions of basic shield and wet road shield can be also advantageously attained by a rotational motor.

Advantageously, for motorway light and wet road light the variable adaptive projector system is vertically adjusted.

The light source can be an arc of discharge lamp, a filament of bulb, or other light source used in the industry.

The light source is located within the ellipsoidal reflector in proximity to the reflector's optical axis so that the reference plane of the light source is generally perpendicular to this optical axis.

The basic mechanism used to vary the position of both shields includes a motor connected to the shields via a linkage and a linear or rotational cam, depending on the nature of the output of the motor. The positions of both shields for low beam, high beam, motorway and wet road light are precisely defined on the utilized cam, with the linkages following predefined pathways in or surfaces on the cams. The particular length of the stroke for a linear output motor, or the turning angle for a rotational output motor, are dependent on the specific geometrical arrangement of the whole mechanism, as may be dictated by design criteria beyond the scope of this invention.

BRIEF DESCRIPTION OF THE DRAWINGS

The preferred, but not limiting, embodiment of the present invention is described below with reference to the accompanying drawings, in which.

DETAILED DESCRIPTION

Figure 1:
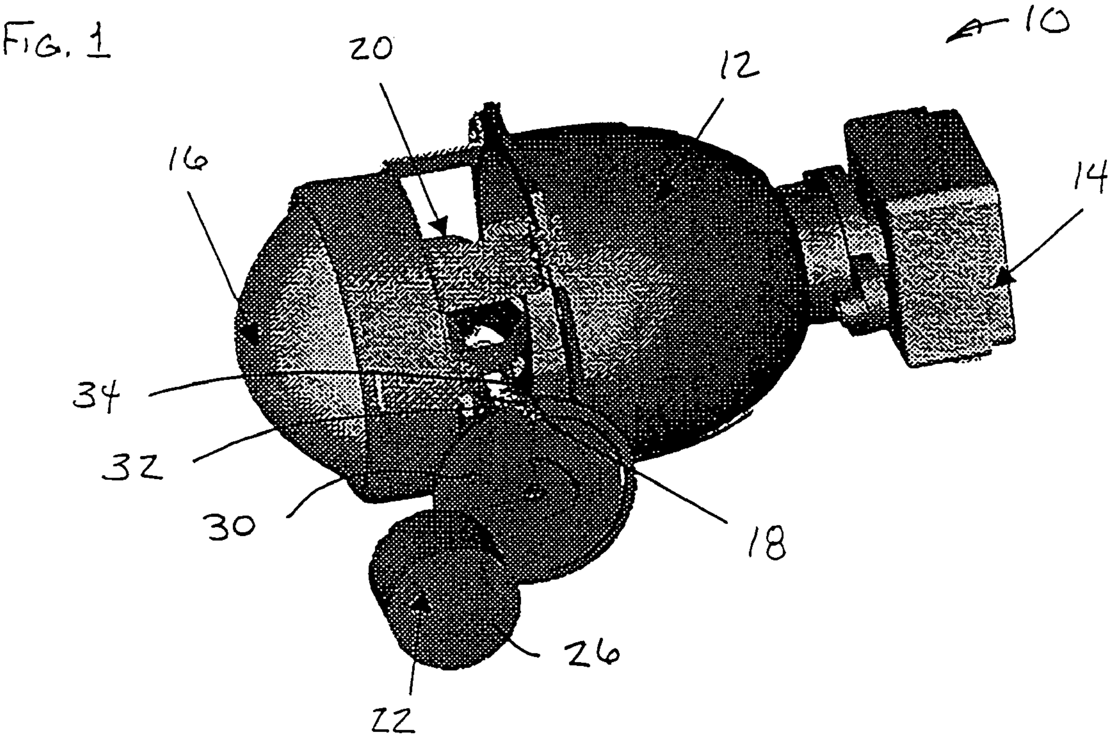
FIG. 1 is a perspective view of an assembly of variable adaptive projector system with rotational motor and cam.
Figure 2:
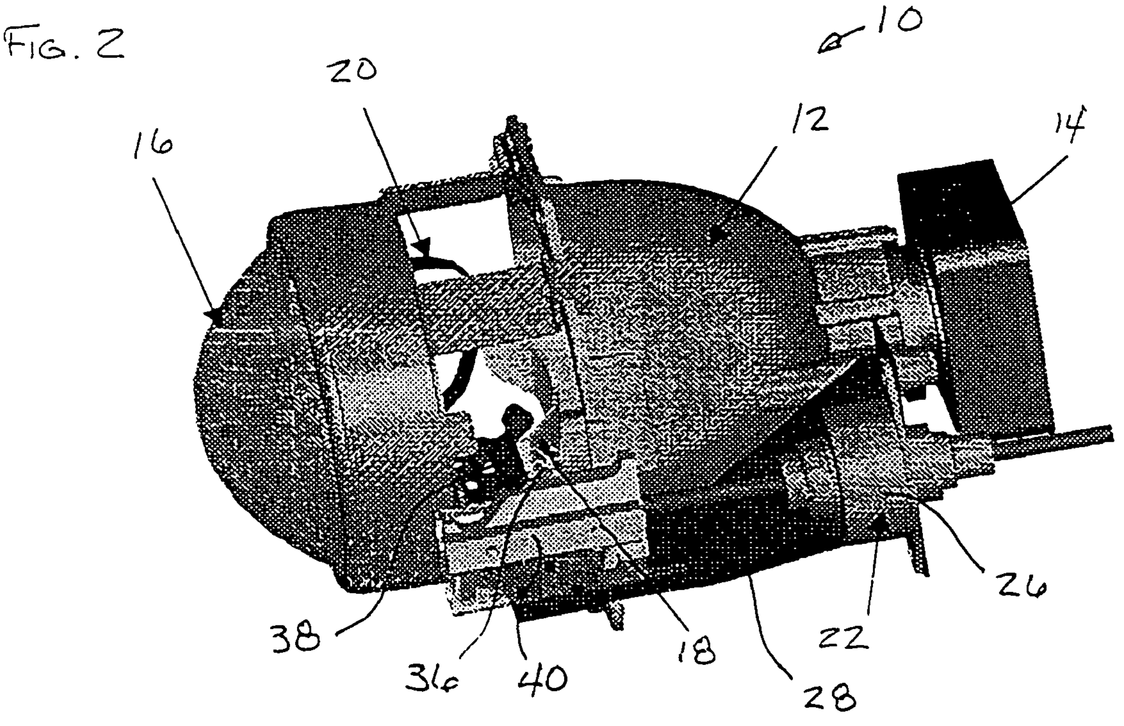
FIG. 2 is a perspective view of an assembly of variable adaptive projector system with linear motor and cam.

Shown in FIGS. 1 and 2 are perspective views of alternate mechanical constructions of a variable adaptive projector system 10 embodying the principles of the present invention. The system 10 generally includes an ellipsoidal reflector 12, a light source 14, an aspherical lens 16, a basic shield 18, a wet road shield 20 and a mechanism 22 for varying the positions of the shields 18, 20 within and relative to the reflector 12. Changing the operational mode of the system for low beam, high beam, wet road and motorway light is made by changing the position of the shields 18, 20 relative to the reflector 12.

The light source 14 is firmly and conventionally arranged inside the ellipsoidal reflector 12 in the proximity to the optical axis 24 defined by the reflector 12. Accordingly, the reference plane of the light source 14 is generally perpendicular to the optical axis 24.

As mentioned above, the pattern of the light beam generated by the system 10 can be changed by changing the position of one of both shields 18, 20. The mechanism 22 for varying the position of the shields 18, 20 include a motor 26 having an output shaft 28 coupled to the shields 18, 20. Depending on packaging and other considerations in the vehicle itself, the motor 26 of the mechanism 22 may either produce a rotary or a linear output via the output shaft 28. A rotary configuration is generally illustrated in FIG. 1, while a linear configuration is generally illustrated in FIG. 2.

In the rotary output construction, the output of the motor 26 causes rotation of a rotary cam 30. The angle of rotation of the output shaft 28, and therefore the angle of rotation of the cam 30, determines the relative position of the shields 18, 20. Accordingly, each of the shields 18, 20 is coupled via a linkage 32, 34 (which in their simplest form may just be bars engaged with the shields and extending to contact the cam) that engages the cam 30 either in a passageway (one for each linkage 32, 34 defined in the cam) or on a cam surface. Upon rotation of the cam 30, the position of the linkages 32, 34 are moved, which in turn causes the positions of the shields 18, 20 to be altered (such as being moved about a pivot) relative to the optical axis 24. By properly configuring the cam passageways or surfaces and rotating the cam 30 a predetermined amount, movement of the linkages 32, 34 and the resulting positions of the shields 18, 20 can be set and controlled as desired.

Similarly, for the linear configuration of the FIG. 2, the shields 18, 20 are coupled via linkages 36, 38 (which in their simplest form may just be bars engaged with the shields and extending to contact the cam) to a linearly moveable cam 40 located on the distal end of the output shaft 28. By properly configuring the cam surfaces and moving the linear cam 40 a predetermined amount, movement of the linkages 36, 38 and the resulting positions of the shields 18, 20 can be set and controlled as desired.

For both of the constructions seen in FIGS. 1 and 2, one of ordinary skill in the art will readily appreciate that the specific geometrical arrangement of the cams 30, 40 as well as the linkages 32, 34, 36, 38 will be dependent on the specific construction of the system 10 as a whole. Further discussion herein is therefore not necessary.

As discussed above, the beam pattern of the light produced by the system 10 can be changed by changing the relative positions of the shields 18, 20 relative to the reflector 12. Changing the beam pattern has various benefits in different driving modes. For example, in what is herein referred to as a wet road light mode of operation, the shields 18, 20 can be shifted in the system 10 such that the light rays that would normally illuminate the foreground of the road will be partially obscured. In doing this, the glare perceived by oncoming drivers, as a result of the reflection of light rays from the wet road surface, can be lowered. This is particularly achieved by movement of the wet road shield 20 to the appropriate position in the wet road light mode of operation.

The basic shield 18 (a flat or curved member of suitable width and shape) creates the light-dark boundary seen in the beam functions other than high beam light. In these operational modes, the top edge of the basic shield 18 is at or slightly shifted from the focal point F of the projector lighting unit. Owing to this fact, the light rays that generate the hot spot of the high beam light function are partly shielded as seen in the "b" designated figures of 3*b*, 4*b* and 5*b*.

Figure 3A:
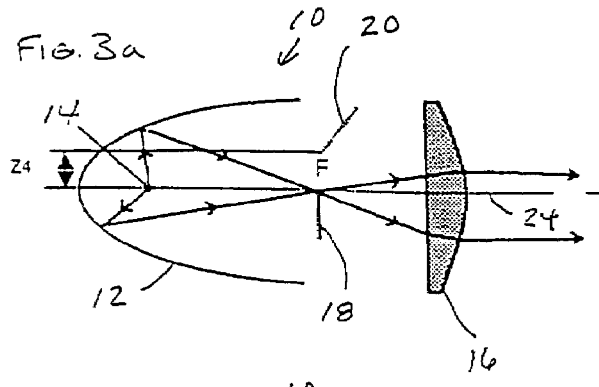
FIGS. 3*a* and 3*b* are, respectively, a schematic view showing the positions of the shields and the shape of the light beam in the low beam light mode of operation.
Figure 3B:
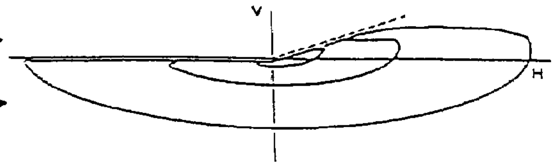

Referring now to FIGS. 3*a* and 3*b*, for low beam light, the location of the basic shield 18 is such that the top edge of the shield 18 is adjacent the focal plane F of the projector lighting unit 10. As a consequence, that the part of light rays, reflected from the ellipsoidal reflector 12, is shielded creating a light-dark boundary of FIG. 3*b*. The shielded light rays would otherwise generate the hot spot used in the high beam function. In the low beam light operational mode, the position of wet road shield 20 is shifted a distance $z_4$ above the focal point F of the ellipsoidal reflector 12, when $z_3<z_4$.

Figure 4A:
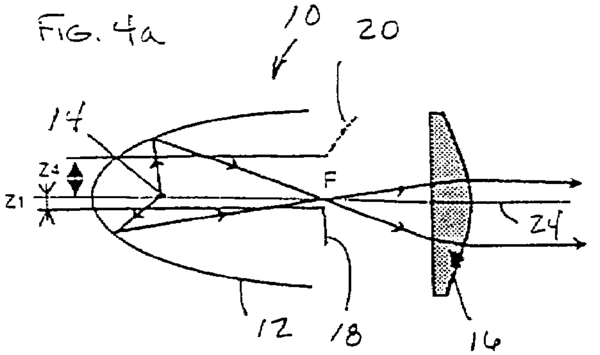
FIGS. 4*a* and 4*b* are, respectively, a schematic view showing the positions of the shields and the shape of the light beam in the motorway light mode of operation.
Figure 4B:
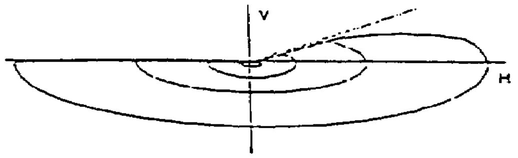

For the motorway light operation mode, seen in FIGS. 4*a* and 4*b*, the basic shield 18 is slightly shifted downward and away from the area of the focal point F of the projector lighting unit 10. The light rays, those generating the hot spot of high beam function, are partly unshielded and this creates a light-dark boundary for low beam function. As seen in FIG. 4*a*, the position of basic shield 18 for motorway light function is shifted a distance $z_1$ below the focal point F of the ellipsoidal reflector 12, when $$z_1=b_1\cdot\alpha+b_3\cdot\alpha^3+b_5\cdot\alpha^5+b_7\cdot\alpha^7+\ldots, \text{ for } \alpha\approx(0 \text{ to } 3),$$

where $b_{1,3,5,7,\ldots}$ are constants characterizing the aspherical lens 16, more specifically the mathematical constraints in the polynomial which represents the focal area of the lens 16 and where α is the angle between the beam cut-off (boundary line between light and dark areas) and a horizontal plane. In this mode of operation, the position of wet road shield 20 is shifted by distance $z_4$ mm above the focal point F of the ellipsoidal reflector, when $z_3<z_4$.

Figure 5A:
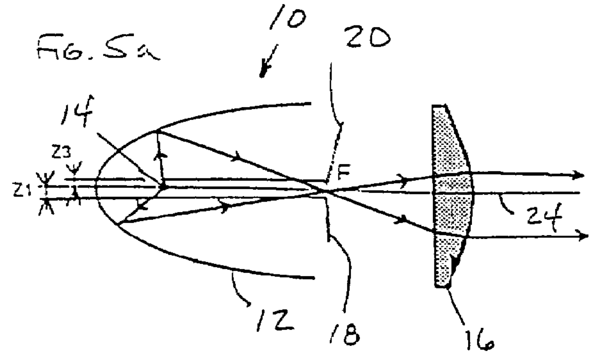
FIGS. 5*a* and 5*b* are, respectively, a schematic view showing the positions of the shields and the shape of the light beam in the wet road light mode of operation.
Figure 5B:
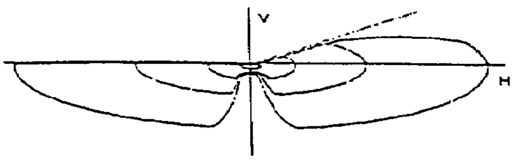

The position of basic shield 18 for the wet road light operational mode is seen in FIGS. 5*a* and 5*b*. Therein the position of the shield 18 is shifted by distance $z_1$ below the focal point F of the ellipsoidal reflector 12, when $$z_1=b_1\cdot\alpha+b_3\cdot\alpha^3+b_5\cdot\alpha^5+b_7\cdot\alpha^7+\ldots, \text{ for } \alpha\approx(0 \text{ to } 3),$$

and the position of wet road shield 20 is shifted by distance $z_3$ above the focal point F of the ellipsoidal reflector 12, when $$z_3=b_1\cdot\beta+b_3\cdot\beta^3+b_5\cdot\beta^5+b_7\cdot\beta^7+\ldots, \text{ for } \beta\approx(0 \text{ to } 5),$$

where $b_{1,3,5,7,\ldots}$ are constants characterizing the aspherical lens 16, as mentioned above and where β is the angle between the beam cutoff (boundary line between light and dark areas) and a horizontal plane, as mentioned above with reference to α.

If the basic shield 18 is removed from the focal plane F of the projector lighting unit, then the light rays, generating the hot spot of high beam function are unshielded. The position of wet road shield 20 in this high beam mode of operation is such that it is not situated in the area of the focal plane F of the projector lighting unit 10.

Figure 6A:
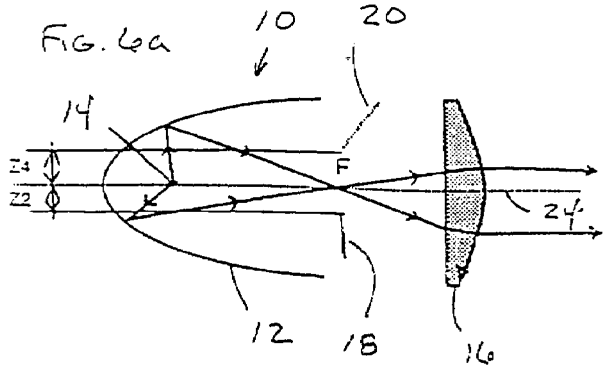
FIGS. 6*a* and 6*b* are, respectively, a schematic view showing the positions of the shields and the shape of the light beam in the high beam light mode of operation.
Figure 6B:
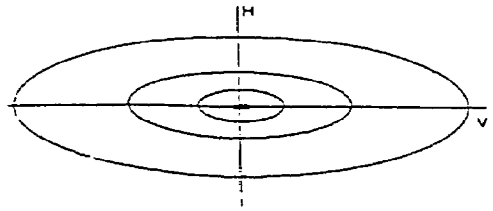

In this mode, as seen in FIGS. 6*a* and 6*b*, the basic shield 18 is shifted a distance $z_2$ below the focal point F of the ellipsoidal reflector 12, when $z_2>z_1$. The position of wet road shield 20 is shifted by a distance $z_4$ above the focal point F of the ellipsoidal reflector 12, when $z_3<z_4$.

As any person skilled in the art will recognize from the previous detailed description and from the figures and claims, modifications and changes can be made to the preferred embodiments of the invention without departing from the scope of this invention defined in the following claims.

The invention claimed is:

1. A multifunction adaptive projector system for motor vehicles comprising:

an ellipsoidal reflector having a focal point and an optical axis;

a light source;

first and second shields, said shields being moveable between a position for low beam light, a position for motorway light, a position for wet road light and a position for high beam light, said shields operable to shield said light source and create a beam cutoff line;

an aspherical lens; and a mechanism for varying the positions of said first and second shields in relation to said reflector between said position for low beam light, said position for motorway light, said position for wet road light and said position for high beam light, wherein in said position for low beam light, said first shield is located in proximity of said focal point;

in said position for motorway light and wet road light, said first shield is shifted and located a first distance, $z_1$, below said focal point where $$z_1=b_1\cdot\alpha+b_3\cdot\alpha^3+b_5\cdot\alpha^5+b_7\cdot\alpha^7+\ldots, \text{ for } \alpha\approx(0 \text{ to } 3),$$

where $b_{1,3,5,7, \ldots}$ are constants characterizing said aspherical lens and where α is the angle between said beam cutoff line created by said first shield and a horizontal plane;

in said position for high beam light, said first shield being shifted and located a second distance below said focal point of said reflector, said second distance being greater than said first distance;

in said positions for low beam light, motorway light and high beam light, said second shield being shifted and located above said focal point of said reflector by a third distance; and in said position for wet road light, said second shield being shifted and located above said focal point by a fourth distance, $z_3$, where $$z_3=b_1\cdot\beta+b_3\cdot\beta^3+b_5\cdot\beta^5+b_7\cdot\beta^7+\ldots, \text{ for } \beta\approx(0 \text{ to } 5),$$

where $b_{1,3,5,7, \ldots}$, are constants characterizing said aspherical lens and where β is the angle between said beam cutoff line created by said second shield and a horizontal plane, said fourth distance being less than said third distance.

2. The multifunction adaptive projector system for motor vehicles according to claim 1 wherein said mechanism includes a motor having an output shaft, said output shaft being linearly moveable and coupled to said first and second shields.

3. The multifunction adaptive projector system for motor vehicles according to claim 2 wherein a linear cam is connected to said output shaft, said linear cam including camming surfaces defining said positions of said first and second shields.

4. The multifunction adaptive projector system for motor vehicles according to claim 1 wherein said positions of said first and second shields are measured perpendicular to said optical axis.

5. The multifunction adaptive projector system for motor vehicles according to claim 3 wherein said positions are vertically aligned with said focal point.

6. The multifunction adaptive projector system for motor vehicles according to claim 1 wherein said mechanism includes a motor having an output shaft, said output shaft being rotatably moveable and coupled to said first and second shields.

7. The multifunction adaptive projector system for motor vehicles according to claim 6 wherein a rotational cam is connected to said output shaft and includes camming surfaces defining said positions of said first and second shields.

8. The multifunction adaptive projector system for motor vehicles according to claim 1 wherein said light source is an arc discharge light source.

9. The multifunction adaptive projector system for motor vehicles according to claim 1 wherein said light source is a filamented light source.

10. A headlamp assembly comprising:

a reflector having a generally concave surface and defining a focal point and an optical axis;

a light source mounted within a concavity defined by said concave surface and being located generally along said optical axis;

a first shield mounted in front of said light source relative to said optic axis, said shield being moveably mounted and having a low beam light position, a motorway light position, a wet road light position and a high beam light position, in said low beam light position said shield being located such that said shield is in proximity to said focal point, in said motorway light position and said wet road light position said shield being located a first distance away from said optical axis, in said high beam light position said shield being located a second distance away from said optical axis, said second distance being greater than said first distance; and a second shield mounted in front of said light source relative to said optic axis, said shield being moveably mounted and having a low beam light position, a motorway light position, a wet road position and a high beam light position, in said wet road light position said second shield being located a third distance from said optical axis, in said low beam light position said second shield being located a fourth distance from said optical axis, said fourth distance being greater than said third distance.

11. The headlamp assembly according to claim 10, further comprising a mechanism for varying the positions of said first and second shields in relation to said reflector between said low beam light position, said motorway light position, said wet road light position, and said high beam light position.

12. The headlamp assembly according to claim 11, wherein said mechanism includes a motor having an output shaft, said output shaft being linearly moveable and coupled to said first and second shields.

13. The headlamp assembly according to claim 12, further comprising a linear cam connected to said output shaft, said linear cam comprising camming surfaces defining said low beam light position, said motorway light position, said wet road light position, and said high beam light position.

14. The headlamp assembly according to claim 10 wherein said low beam light position, said motorway light position, said wet road light position, and said high beam light position are measured perpendicular to said optical axis.

15. The headlamp assembly according to claim 10 wherein said low beam light position, said motorway light position, said wet road light position, and said high beam light position are vertically aligned with said focal point.

16. The headlamp assembly according to claim 11 wherein said mechanism includes a motor having an output shaft, said output shaft being rotatably moveable and coupled to said first and second shields.

17. The headlamp assembly according to claim 16 wherein a rotational cam is connected to said output shaft, the rotational cam comprising camming surfaces defining said low beam light position, said motorway light position, said wet road light position, and said high beam light position.

18. The headlamp assembly according to claim 10 wherein said light source is an arc discharge light source.

19. The headlamp assembly according to claim 10 wherein said light source is a filamented light source.

* * * * *